United States Patent Office 3,231,556
Patented Jan. 25, 1966

3,231,556
SHORT-STOP CHLOROPRENE POLYMERIZATION WITH OXALATE IONS
Henry Malcolm Hutchinson, Banstead, England, assignor to The Distillers Company Limited, Edinburgh, Scotland, a British company
No Drawing. Filed Jan. 4, 1962, Ser. No. 164,422
6 Claims. (Cl. 260—92.3)

The present invention relates to the polymerisation of chloroprene. It particularly relates to the polymerisation of chloroprene in aqueous emulsion to give a synthetic rubber latex.

It is known that in the emulsion polymerisation of chloroprene it is necessary to stop the polymerisation before all the monomer has polymerised in order to get commercially useful products. To stop the polymerisation it is customary to add a "short stop" agent to the reaction mixture and various agents have been suggested. Examples are p-tert-butyl catechol and phenothiazine.

An object of the present invention is to provide an improved short stop agent for use in the aqueous emulsion polymerisation of chloroprene.

According to the present invention the process for the production of polychloroprene comprises polymerising chloroprene in aqueous emulsion and stopping polymerisation while the reaction mixture contains unpolymerised chloroprene by the addition of a water soluble source of oxalate ions.

The polymerisation of chloroprene in aqueous emulsion is well known and many polymerisation techniques are known and can be employed.

Before the polymerisation of the chloroprene is complete the polymerisation reaction is halted by the addition of a water soluble source of oxalate ions. Suitable sources are oxalic acid, the alkali metal salts of oxalic acid such as sodium, potassium, lithium, and the mixed sodium potassium salt, the ammonium salt of oxalic acid, and the acid salts of the above such as sodium hydrogen oxalate, potassium hydrogen oxalate, potassium tetra oxalate and ammonium acid oxalate. The preferred sources of oxalate ions are those which give rise to colorless solutions when dissolved in water.

The concentration of the oxalate short stop agent in the process of the present invention can be varied widely and amounts as low as 0.1 millimol per mol of unreacted chloroprene remaining in the reaction mixture can be employed. Preferably amounts from 0.15 to 20 millimols per mol of unreacted chloroprene are used. Higher quantities can be employed without any detrimental effect on the resultant polymer since any excess may be readily washed therefrom. However, it is generally unnecessary to employ more than 20 millimols per mol of unreacted chloroprene.

The water soluble source of oxalate ions is added to the reaction mixture when the desired proportion of the chloroprene has polymerised. This proportion may be varied widely according to the nature of the synthetic rubber desired. Generally it is between 0.6 and 0.8 of the chloroprene initially taken.

The polychyoroprene produced according to the process of the present invention is of excellent quality and is of particularly good color if the source of oxalate ions employed gives a colorless solution in water.

The following example illustrates the process of the present invention.

Example

| | Parts by weight |
|---|---|
| Chloroprene | 100 |
| Water | 150 |
| The sodium salt of a disproportionated resin acid | 4 |
| The sodium salt of a formaldehyde-naphthalene condensation product | 0.7 |
| Hydrated sodium triphosphate | 0.7 |
| n-Lauryl mercaptan | 0.28 |
| Ammonium persulphate | 0.005 |

The above ingredients were formed into an aqueous emulsion and maintained at 40° C. when polymerisation of the chloroprene took place. When 70% of the chloroprene had polymerised a solution of 0.11 part by weight of sodium oxalate in 4 parts by weight of water was added. The emulsion was then allowed to stand for 12 hours at room temperature and it was found that at the end of this period the total amount of chloroprene polymerised had only increased by 0.6%.

The polychloroprene was readily isolated from the aqueous emulsion as a high quality product by the techniques well known in the synthetic rubber industry. It had excellent color and showed excellent stability.

I claim:

1. A process for the production of polychloroprene which comprises polymerising chloroprene in aqueous emulsion in the presence of persulphate ions as sole catalyst component and stopping polymerisation while the reaction mixture contains unpolymerised chloroprene by the addition of a water soluble oxalate which in aqueous solution provides oxalate ions as the sole short stopping agent.

2. A process as claimed in claim 1 wherein the oxalate forms a colorless solution when dissolved in water.

3. A process as claimed in claim 1 wherein an amount of oxalate is added sufficient to provide 0.15 to 20 millimols of oxalate ion per mol of unreacted chloroprene.

4. A process as claimed in claim 1 wherein the oxalate is added when between 0.6 and 0.8 of the chloroprene initially taken has polymerised.

5. A process as claimed in claim 1 wherein the persulphate ions are derived from a water soluble persulphate incorporated in the reaction mixture.

6. A process as claimed in claim 5 wherein the water soluble persulphate is ammonium persulphate.

References Cited by the Examiner

UNITED STATES PATENTS

| | | | |
|---|---|---|---|
| 2,473,549 | 6/1949 | Smith | 260—92.3 |
| 2,538,260 | 1/1951 | Messer et al. | 260—92.3 |
| 2,684,357 | 7/1954 | Troyan et al. | 260—92.3 |
| 2,953,554 | 9/1960 | Miller et al. | 260—94.3 |
| 3,084,143 | 4/1963 | Hieserman et al. | 260—85.5 |
| 3,107,237 | 10/1963 | Smith | 260—92.3 |

LEON J. BERCOVITZ, *Primary Examiner.*

LOUISE QUAST, DONALD CZAJA, *Examiners.*